United States Patent [19]

Seki et al.

[11] 4,420,599
[45] Dec. 13, 1983

[54] PROCESS OF PRODUCING COPOLYMERS OF AN AROMATIC VINYL MONOMER AND MALEIC ANHYDRIDE

[75] Inventors: Kenji Seki; Eiichi Terada, both of Sodegaura, Japan

[73] Assignee: Idemitsu Kosan Company Limited, Tokyo, Japan

[21] Appl. No.: 400,471

[22] Filed: Jul. 21, 1982

[30] Foreign Application Priority Data

Aug. 5, 1981 [JP] Japan .............................. 56-121878
Aug. 5, 1981 [JP] Japan .............................. 56-121879

[51] Int. Cl.$^3$ ..................... C08F 222/08; C08F 8/48; C08F 222/16
[52] U.S. Cl. .................................. 526/318; 526/271
[58] Field of Search ............................... 526/271, 318

[56] References Cited

U.S. PATENT DOCUMENTS

| | | | |
|---|---|---|---|
| 2,798,053 | 7/1957 | Brown | 526/271 |
| 2,838,475 | 6/1958 | Barrett | 526/271 |
| 3,238,168 | 3/1966 | Wolff et al. | 526/318 |
| 3,684,776 | 8/1972 | Field et al. | 526/271 |
| 4,048,379 | 9/1977 | Jidai et al. | 526/271 |
| 4,229,559 | 10/1980 | Cotter et al. | 526/271 |
| 4,243,784 | 1/1981 | Akima et al. | 526/319 |

*Primary Examiner*—Joseph L. Schofer
*Assistant Examiner*—Peter F. Kulkosky
*Attorney, Agent, or Firm*—Frishauf, Holtz, Goodman & Woodward

[57] ABSTRACT

A process of producing a copolymer of aromatic vinyl compound and maleic anhydride by adding half-ester maleate in two or more steps to the aromatic vinyl compound to perform the copolymerization reaction, and dealcoholating the unit of the half-ester maleate in the resulting copolymer to cyclize. The thus obtained aromatic vinyl compound-maleic anhydride copolymer has excellent transparency and thermal resistance.

17 Claims, No Drawings

PROCESS OF PRODUCING COPOLYMERS OF AN AROMATIC VINYL MONOMER AND MALEIC ANHYDRIDE

BACKGROUND OF THE INVENTION

This invention relates to a process of producing copolymers, and more particularly to a process of producing styrene-based copolymers having excellent transparency and thermal resistance which is capable of performing bulk continuous polymerization having excellent manufacturing efficiency in an industrially advantageous manner.

In general, as styrene-based resin having excellent thermal resistance, styrene-maleic anhydride copolymers have been known.

However, a copolymerization reaction of the aromatic vinyl compound such as styrene and maleic anhydride tends to produce an alternate copolymer since the reactivity of the maleic anhydride is high. Therefore, it has been impossible in ordinary processes to produce the uniform and useful copolymer in which the content of maleic anhydride unit is controlled within a specified range.

For this reason, as processes of producing such useful copolymer, (1) a process of performing copolymerization of styrene and maleic anhydride by bulk polymerization to the extent of 5 to 40% of styrene to complete copolymerization substantially, and performing polymerization of styrene remaining by suspension polymerization (Japanese Patent Publication No. 19914/1979), and (2) a process of adding methyl methacrylate as a third ingredient when the styrene and maleic anhydride are copolymerized (Japanese Patent Laid-open Publication No. 102614/1980) have been known.

However, in the foregoing process (1), the product becomes a mixture of the copolymer having extremely high content of the maleic anhydride which is obtained by the bulk polymerization and a styrene homopolymer which is obtained by the suspension polymerization. Therefore, the above process (1) has defects that the copolymer produced has low thermal resistance and inferior transparency, and that the copolymer becomes heterogeneous since it is precipitated in the bulk polymerization. On the other hand, in the foregoing method (2), since the methyl methacrylate is indispensable as the third ingredient, it is impossible to obtain the styrene-maleic anhydride copolymer and copolymer obtained is different therefrom.

SUMMARY OF THE INVENTION

An object of this invention is to provide a process of producing efficiently a styrene-based copolymer which has excellent physical properties particularly transparency and thermal resistance in a simple operation continuously. Also, another object of this invention is to manufacture a styrene-based copolymer having excellent impact resistance as well as thermal resistance.

According to the process of this invention, a copolymer of aromatic vinyl compound and maleic anhydride is produced by adding half-ester maleate in two or more steps of the aromatic vinyl compound to perform the copolymerization, and cyclizing the unit of half-ester maleate by dealcoholation.

The present invention provides a process for the production of copolymer of aromatic vinyl compound and maleic anhydride. The copolymer has an excellent transparency and thermal resistance.

DETAILED DESCRIPTION OF THE INVENTION

The aromatic vinyl compound which is used in this invention is a main starting material for the production of the copolymer. Examples of the aromatic vinyl compounds include styrene, α-methylstyrene, dimethylstyrene, diethylstyrene, monochlorostyrene, dichlorostyrene, vinyl toluene and their mixtures, Also, the half-ester maleate to be copolymerized with the aromatic vinyl compound is a monoester produced by adding alcohol having from 1 to 8 carbon atoms to the maleic anhydride, and usually, it can be obtained by a method in which the maleic anhydride and predetermined alcohol are mixed in almost equal mole, and are reacted with each other at a temperature below 100° C. for from 1 to 3 hours. Examples of the half-ester maleates include monomethyl maleate, monoethyl maleate, mono-n-propyl maleate, mono-n-butyl maleate and the like.

In the process of this invention, where the aromatic vinyl compound and the half-ester maleate are copolymerized, it is necessary to divide the half-ester maleate into two or more parts, and usually into from two to five parts and then to add each part to the reaction system. When the half-ester maleate is added to the reaction system in one stage without dividing into two or more parts, though the abrupt reaction which may occur in case of addition of the maleic anhydride does not proceed, a copolymer having relatively higher content of the half-ester maleate is produced likewise in the early period of the polymerization reaction, and the content is lowered gradually and the homopolymer of the aromatic vinyl compound having no content of the half-ester maleate is produced finally. As the result, the copolymer produced becomes a mixture thereof, and has inferior transparency. When the maleic anhydride is used instead of the half-ester maleate, the copolymerization reaction proceeds so rapidly that the control of the reaction becomes extremely difficult and the maleic anhydride is required to be added in small amount sequentially. But when the half-ester maleate is used according to the process of this invention, and if it is divided into two to five parts and each part is added, then the desired copolymer having excellent transparency and thermal resistance can be produced.

As described in the foregoing, when the half-ester maleate is added to the reaction system in two or more steps, it may be added in equal amount for each step, or in the amount to be decreased sequentially.

In the process of this invention, there is particularly no limitation for the ratio of the amount of the aromatic vinyl compound and the half-ester maleate, and it may be properly selected according to physical properties of the desired copolymer, but usually, it is set that the aromatic vinyl compound is from 60 to 98% by weight and the half-ester maleate is from 40 to 2% by weight. Particularly preferable ratio should be from 70 to 95% by weight of the aromatic vinyl compound and from 30 to 5% by weight of the half-ester maleate.

Also, in the process of this invention, in order to improve the impact resistance of the copolymer to be obtained, it is possible to carry out the copolymerization reaction of the aromatic vinyl compound and the half-ester maleate in the presence of rubber. As the rubber to be present in the reaction system, various kinds may be employed, for example, butadiene rubber, styrene-butadiene rubber, isoprene rubber, butadiene-acrylonitrile rubber and the like can be employed. The amount of the rubber may be properly determined depending on the desired properties of the copolymer. In case of large amount of the rubber, the impact resistance of the copolymer to be obtained is improved, but the transparency is dropped. Therefore, the amount of the rubber shoud be adjusted according to the use of the copolymer, and usually, the amount of the rubber may be set at from 2 to 30 parts by weight based on 100 parts by weight of the total amount of the aromatic vinyl compound and the half-ester maleate.

Also, particularly in order to improve impact resistance of the copolymer, the number of times of the addition of the half-ester maleate may be decreased during the copolymerization reaction, namely, to about two.

In this invention, other vinyl compounds can be added, if desired. Examples of these vinyl compounds include acrylonitrile, methacrylonitrile, acrylic acid, esters of acrylic acid, esters of methacrylic acid and the like. The amount of the vinyl compound is not particularly limited, but usually, it may be set in the range of below 40 parts by weight based on 100 parts by weight of the total amount of the aromatic vinyl compound and the half-ester maleate.

Also, in the process of this invention, it is possible to add a catalyst or a polymerization regulator to the reaction system for the promotion of polymerization reaction or the adjustment of polymerization degree. As the catalyst, a radical generating agent and the like can be used, and examples of the catalysts include organic peroxides such as dicumyl peroxide, lauroyl peroxide, benzoyl peroxide and the like or azo type polymerization initiator such as azobisisobutylonitrile and the like. As the polymerization regulator, mercaptans and the like can be used.

Furthermore, in the process of this invention, the medium such as water or organic solvent is not necessarily used when the reaction is carried out since the polymerization reaction proceeds sufficiently by the bulk polymerization. But a small amount of the solvent may be added to the reaction system or solution polymerization may be carried out. As the solvent to be used in the solution polymerization, ketones such as acetone, methyl ethyl ketone; aromatics such as toluene, benzene; or cyclohexane and the like are preferably used.

In the process of this invention, the aromatic vinyl compound is added to the reaction system, and also, if necessary, other vinyl compounds, catalyst, polymerization regulator, rubber component or solvent is added, and thereafter, the half-ester maleate may be divided into some parts and added to the reaction system at a proper interval. Of course, although it is possible to add the part of the half-ester maleate at the beginning to the reaction system, in case the whole amount of the half-ester maleate to be used is added at the beginning, the object of this invention cannot be achieved as described in the foregoing.

As the reaction condition, there is particularly no limitation, and it may be properly selected. Usually it is set a temperature of from 50° to 180° C., and preferably from 70° to 160° C., and the polymerization type may be selected from any of the bulk polymerization, solution polymerization and the like. Also, both continuous type and batch type may be employed. Particularly, the process of this invention is suitable for the continuous bulk polymerization, and the reaction can be proceeded with extremely high efficiency.

According to the process of this invention as described above, copolymer of aromatic vinyl compound and half-ester maleate is obtained in the first place. Next, the resulting copolymer of aromatic vinyl compound and half-ester maleate is subjected to treatments such as drying under reduced pressure, melting with heat by using a flasher, thin film evaporator, extruding machine and the like to dealcoholate the copolymer. As the result, the unit of the half-ester maleate in the copolymer is cyclized to convert to the unit of the maleic anhydride. When the foregoing treatment is carried out, the copolymer of aromatic vinyl compound and maleic anhydride having extremely excellent transparency and thermal resistance can be obtained.

As described in the foregoing, the process of this invention is able to provide a desired copolymer by carrying out the divisional addition of the half-ester maleate in about from two to five steps without making the sequential addition of the starting materials. The operation of the process is easy and also the apparatus used is simple and therefore the process of this invention is an extremely advantageous as an industrial process. Also, the process can be carried out by the continuous bulk polymerization, and as the precipitation of the polymer during the polymerization is not taken place, the manufacturing efficiency is remarkably high. Moreover, since the content of the maleic anhydride unit in the copolymer to be obtained can be adjusted optionally to the range of below 40% by weight, the various aromatic vinyl compound-maleic anhydride copolymers having excellent transparency, thermal resistance and melting fluidity and the like can be obtained according to the use of the product.

The resulting copolymer can be effectively utilized as the material for various industrial field, building material or packing material.

This invention will be described in details by referring to the following examples.

EXAMPLE 1

To a complete mixing reactor having 2 liter-volume, 1,240 grams of styrene, 159.5 grams of mono-n-butyl maleate, 1.56 grams of dicumyl peroxide and 220 grams of toluene were charged, and the reaction was carried out at 117° C. for 3 hours. The conversion at the first step was 50%. And then, 88.5 grams of mono-n-butyl maleate was added to the reaction system, and the reaction was continued for 6 hours. Thereafter, the reaction product was reprecipitated and purified in the petroleum ether, and was dried under reduced pressure whereby the copolymer of styrene-mono-n-butyl maleate was obtained. The final conversion was 80%. Successively, this copolymer was supplied to the vent extruding machine at 230° C., and then the dealcoholation was carried out in the machine to cyclize the unit of the mono-n-butyl maleate in the copolymer to convert to the unit of the maleic anhydride, whereby the styrene-maleic anhydride copolymer (conversion 85%) was obtained. The properties of the copolymer are shown in Table 1.

EXAMPLE 2

To a complete mixing reactor having 2 liter-volume, 1,240 grams of styrene, 112.7 grams of mono-n-butyl maleate, 1.56 grams of dicumyl peroxide and 220 grams of toluene were charged, and the reaction was carried out at 117° C. for 2 hours. The conversion at the first step was 30%. And then, 82.6 grams of mono-n-butyl maleate was added to the reaction system, and the reaction was continued for 3 hours. The conversion at the second step was 50%. Furthermore, 56.6 grams of mono-n-butyl maleate was added to this reaction system and the reaction was continued for 3.5 hours. Thereafter, the reaction product was reprecipitated and purified in the petroleum ether, and was dried under reduced pressure whereby the styrene-mono-n-butyl maleate copolymer was obtained. The final conversion was 82%. Successively, this copolymer was supplied to the vacuum drier at 210° C., and then the dealcoholation was carried out to cyclize the unit of the mono-n-butyl maleate in the copolymer to convert to the unit of the maleic anhydride, whereby the copolymer of styrene and maleic anhydride (conversion 100%) was obtained. The properties of the copolymer are shown in Table 1.

EXAMPLE 3

To a complete mixing reactor having 2 liter-volume, 1,240 grams styrene, 85.2 grams of monomethyl maleate. 1.56 grams of dicumyl peroxide and 220 grams of toluene were charged, and the reaction was carried out at 117° C. for 2 hours. The conversion at the first step was 28%. And then, 61.4 grams of monomethyl maleate was added to the reaction system, and the reaction was continued for 2 hours. The conversion at the second step was 52%. To this reaction system, 42.8 grams of monomethyl maleate was added and the reaction was continued for 3.5 hours. Thereafter, the reaction product was reprecipitated and purified in the petroleum ether, and was dried under reduced pressure whereby a styrene-monomethyl maleate copolymer was obtained. The final conversion was 81%. Successively, this copolymer was supplied to the vacuum drier at 210° C., and then the dealcoholation was carried out in this stage to cyclize the unit of the monomethyl maleate in the copolymer to convert to the unit of the maleic anhydride, whereby the styrene-maleic anhydride copolymer (conversion 100%) was obtained. The properties of the copolymer are shown in Table 1.

REFERENTIAL EXAMPLE 1

To a complete mixing reactor having 2 liter-volume, 1,240 grams of styrene, 248 grams of mono-n-butyl maleate, 1.56 grams of dicumyl peroxide and 220 grams of toluene were charged, and the reaction was carried out at 117° C. for 3 hours, and thereafter, the reaction product was reprecipitated and purified in the petroleum ether, and was dried under reduced pressure, whereby the copolymer of styrene and mono-n-butyl maleate was obtained. The final conversion was 45%. Subsequently, this copolymer was supplied to the vacuum drier at 210° C., and then the dealcoholation was carried out in this stage to cyclize the unit of the mono-n-butyl maleate in the copolymer to convert to the unit of the maleic anhydride, whereby the copolymer of styrene and maleic anhydride (conversion 100%) was obtained. The properties of the copolymer are shown in Table 1.

EXAMPLE 4

To a complete mixing reactor having 2 liter-volume. 1,240 grams of styrene, 103.7 grams of mono-n-butyl maleate were charged, and the reaction was carried out at 140° C. for 1.5 hours. The conversion of the first step was 31%. And then, 76.0 grams of mono-n-butyl maleate was added to the reaction system, and the reaction was continued for 2 hours. The conversion at the second step was 63%. Furthermore, 52.1 grams of the mono-n-butyl maleate was added to the reaction system, and the reaction was continued at 150° C. for 2 hours. The final conversion was 81%. Thereafter, the reaction product was dried in vacuum condition at 210° C. to eliminate the residual monomer and at the same time, the dealcoholation was carried out to cyclize the unit of the mono-n-butyl maleate in the copolymer to convert to the unit of the maleic anhydride, whereby the styrene-maleic anhydride copolymer (conversion 100%) was obtained. The properties of the copolymer are shown in Table 1.

COMPARATIVE EXAMPLE 1

Except for making the reaction time to be 10 hours in the Referential Example 1, the same operation as in Referential Example 1 was carried out, and the styrene-mono-n-butyl maleate copolymer was obtained (the conversion 78%). Successively, this copolymer was dealcoholated in the same condition as in the Referential Example 1, whereby the copolymer of styrene and maleic anhydride (conversion 100%) was obtained. The properties of the copolymer are shown in Table 1.

COMPARATIVE EXAMPLE 2

Except for the use of monomethyl maleate instead of the mono-n-butyl maleate in the Comparative Example 1, the same operation as in the Comparative Example 1 was carried out, whereby the copolymer of styrene and monomethyl maleate was obtained (conversion 80%), and furthermore, the dealcoholation was carried out in the same condition as in Comparative Example 1, whereby the styrene-maleic anhydride copolymer (conversion 100%) was obtained. The properties of the copolymer are shown in Table 1.

REFERENTIAL EXAMPLE 2

To a stainless reactor having 2 liter-volume 7,000 grams of styrene was charged and the stirring was started to carry out at 70° C. And then, a mixture consisting of 500 grams of maleic anhydride, 10 grams of azobisisobutylonitrile and 3,000 grams of methylethyl ketone was continuously added at a ratio of 9 milliliters/min. for 5 hours, successively, at a ratio of 4.9 milliliters/min. for 4 hours, and further, at a ratio of 2.5 milliliters/min. for 1.5 hours to carry out the reaction. The reaction product was poured into the petroleum ether to recover the copolymer and was dried under reduced pressure whereby the copolymer of styrene and maleic anhydride was obtained. The properties of the copolymer are shown in Table 1.

EXAMPLE 5

In this example, the first reactor, the second reactor, the third reactor and a thin film evaporator were used, and bulk continuous copolymerization was carried out.

The first reactor has a stirrer capable of rotating at 60 rpm and its capacity is 12 liters. The second reactor is a tubular type reactor with outer cooler and its capacity is 16 liters. The third reactor is a tubular type reactor with outer cooler and its capacity is 20 liters. The thin film evaporator has a stirrer capable of rotating at 25 rpm and its capacity is 20 liters. The top of the second reactor is connected with the bottom of the first reactor. The top of the third reactor is connected with the bottom of the second reactor. One end of the thin film evaporator is connected with the bottom of the third reactor. To the first reactor maintained at 135° C., 6 liters/hr. of styrene and 250 milliliters/hr. of mono-n-butyl maleate were charged, and the resulting mixture was reacted therein. Thereafter, the mixture discharged out of the bottom of the first reactor was introduced into the second reactor which was maintained at 138° C. At the same time, 230 milliliters/hr. of mono-n-butyl maleate were charged into the second reactor. After the resulting mixture was reacted therein, the mixture was discharged out of the bottom of the second reactor and was introduced into the third reactor which was maintained at 175° C. At the same time, 235 milliliters/hr. of mono-n-butyl maleate were charged into the third reactor. After reaction, the resulting mixture was discharged out of the bottom of the third reactor and was introduced into the thin film evaporator, which was maintained at 220° C. under 200 torr., to dealcoholate in a 100% conversion. In the mixture discharged out of the bottom of the third reactor, 91% thereof was the copolymer of styrene and mono-n-butyl maleate. That is, the conversion to the copolymer of styrene and mono-n-butyl maleate was 91%.

The product by dealcoholating in the thin film evaporator was the copolymer of styrene and maleic anhydride. The properties of the copolymer of styrene and maleic anhydride are shown in Table 1.

hand, in the Comparative Examples 1 and 2, the transparency of the resulting copolymer is remarkably low and in the Comparative Example 3, the tensile strength and the thermal resistance are low. Whereas, in the Examples 1-5, inspite of the fact that the operation is relatively simple, the conversion is high, and the resulting copolymer has the excellent transparency and the thermal resistance.

EXAMPLE 6

To the complete mixing reactor having 2 liter-volume, 1,240 grams of styrene, 89 grams of polybutadiene rubber (tradename: 35 AS, made by Asahi Chemical Industry Co., Ltd.), 112.7 grams of mono-n-butyl maleate, 1.56 grams of dicumyl peroxide and 220 grams of toluene were charged, and the reaction was carried out at 117° C. for 2 hours (conversion 30%). And then, 82.6 grams of the mono-n-butyl maleate was added to this reaction system and the reaction was continued for 3 hours (conversion 50%). Successively, 56.6 grams of the mono-n-butyl maleate was added to this reaction system, and the reaction was continued for 3.5 hours. Thereafter, the reaction product was reprecipitated into the petroleum ether to be purified, and was dried under reduced pressure, whereby the rubber denatured copolymer of styrene and mono-n-butyl maleate was obtained. The final conversion was 82%. Finally, this

TABLE 1

| No. | Average molecular weight | Content of maleic anhydride unit (mol %) | Melt index** (grams/10 min.) | Tensile strength (kilograms/cm²) | Thermal deformation temperature*** (°C.) | Percent transmission (%) |
|---|---|---|---|---|---|---|
| Example 1 | 258000 | 14.0 | 1.3 | 610 | 109 | 84 |
| Example 2 | 294000 | 12.5 | 1.4 | 590 | 114 | 91 |
| Example 3 | 234000 | 11.0 | 3.2 | 585 | 112 | 90 |
| Referential Example 1 | 268000 | 16.0 | 1.2 | 600 | 117 | 90 |
| Comparative Example 1 | 243000 | 12.5 | 2.1 | 540 | 108 | 40 |
| Comparative Example 2 | 227000 | 13.5 | 1.8 | 565 | 107 | 38 |
| Referential Example 2 | 186000 | 15.5 | 1.4 | 570 | 110 | 92 |
| Comparative Example 3* | 280000 | 0 | 6.5 | 490 | 89 | 92 |
| Example 4 | 235000 | 10.0 | 2.7 | 580 | 110 | 89 |
| Example 5 | 230000 | 7.1 | 3.5 | 540 | 105 | 92 |

Remarks:
*General purpose polystyrene commercially available.
**Measurement was carried out at temperature 230° C. with load 2,160 grams.
***Measurement was carried out at 18.6 kilograms/cm².

The following matters become obvious from the foregoing results. Namely, although the Referential Example 1 is one step reaction, the reaction time is short so that it becomes almost same with the case where the process of this invention is stopped at the first step. However, the physical property of the resulting copolymer is satisfactory but, since the conversion is low, it cannot be served for practical purpose. Also, in the Referential Example 2, the maleic anhydride is used so that the sequential addition has to be carried out which makes the operation to be troublesome. On the other copolymer was subjected to dealcoholation in the vacuum drier at 210° C. to perform the cyclization reaction, whereby the rubber denatured copolymer of styrene and maleic anhydride was obtained. The properties of the resulting copolymer are shown in Table 2.

COMPARATIVE EXAMPLE 4

As for high impact polystyrene commercially available, the properties were measured. The results are shown in Table 2.

TABLE 2

| No. | Average molecular weight | Content of maleic anhydride unit (mol %) | Melt index** (g/10 min) | Tensile strength (kg/cm²) | Izod impact test (with notch) (kg · cm/cm) | Thermal deformation temperature*** (°C.) |
| --- | --- | --- | --- | --- | --- | --- |
| Example 6 | 256000 | 12.0 | 0.9 | 410 | 8.7 | 114 |
| Comparative Example 4* | 220000 | 0 | 4.0 | 350 | 9.8 | 82 |

*High impact polystyrene commercially available.
**Measurement was carried out at temperature 230° C. with load 2,160 grams.
***Measurement was carried out at 18.6 kilograms/cm².

What is claimed is:

1. In a process for producing a copolymer of an aromatic vinyl compound and maleic anhydride, the improvement comprising copolymerizing a monoester maleate and the aromatic vinyl compound, the monoester maleate and the aromatic vinyl compound being present in a ratio of 40-2:60-98% by weight, wherein the monoester maleate is added to the aromatic vinyl compound in at least two steps to thereby obtain a monoester maleate-aromatic vinyl compound copolymer, and wherein no more than 50% of the monoester maleate and the aromatic vinyl compound are converted to the monoester maleate-aromatic vinyl compound in any one of said steps and dealcoholating the monoester maleate portion of the copolymer to obtain the aromatic vinyl compound-maleic anhydride copolymer.

2. The process of claim 1 wherein the aromatic vinyl compound is at least one compound selected from the group consisting of styrene, alpha-methylstyrene, dimethylstyrene, diethylstyrene, monochlorostyrene, dichlorostyrene and vinyltoluene.

3. The process of claim 1 wherein the monoester maleate is at least one compound selected from the group consisting of monomethyl maleate, monoethyl maleate, mono-n-propyl maleate and mono-n-butyl maleate.

4. The process of claim 1 wherein the total amount of monoester maleate and the aromatic vinyl compound is in a ratio of 30-5:70-95% by weight.

5. The process of claim 1 wherein the monoester maleate is added in from two to five steps.

6. The process of claim 5 wherein the amount of monoester maleate added in each step decreases sequentially.

7. The process of claim 1 further comprising conducting the copolymerization reaction by bulk copolymerization.

8. The process of claim 7 further comprising conducting the copolymerization reaction by bulk continuous copolymerization.

9. The process of claim 1 wherein the copolymerization reaction is conducted in the presence of a rubber compound.

10. The process of claim 9 wherein the rubber compound is present in an amount of from 2 to 30 parts by weight based on 100 parts by weight of the total amount of the aromatic vinyl compound and the monoester maleate.

11. The process of claim 10 wherein the rubber compound is selected from the group consisting of butadiene rubber, styrene-butadiene rubber, isoprene rubber, and butadiene-acrylonitrile rubber.

12. The process of claim 1 further comprising conducting the polymerization reaction in the presence of at least one other vinyl-group containing compound.

13. The process of claim 1 further comprising conducting the polymerization reaction in the presence of a polymerization catalyst.

14. The process of claim 1 further comprising conducting the polymerization reaction in the presence of an organic solvent.

15. The process of claim 1 further comprising copolymerizing the monoester maleate and the aromatic vinyl compound wherein the monoester maleate is added in from two to five steps and is selected from the group consisting of monomethyl maleate, monoethyl maleate, mono-n-propyl maleate, mono-n-butyl maleate, in the presence of an organic solvent, a rubber compound and a polymerization catalyst, and dealcoholating the monoester maleate portion of the copolymer to obtain the aromatic vinyl-maleic anhydride copolymer.

16. The process of claim 15 wherein the organic solvent is toluene and the polymerization catalyst is dicumyl peroxide.

17. The process of claim 1 further comprising copolymerizing the monoester maleate and the aromatic vinyl compound wherein the monoester maleate is at least one compound selected from the group consisting of monomethyl maleate, monoethyl maleate, mono-n-propyl maleate and mono-n-butyl maleate and the aromatic vinyl compound is selected from the group consisting of styrene, alpha-methylstyrene, dimethylstyrene, diethylstyrene, monochlorostyrene, dichlorostyrene, and vinyl toluene, the total amount of the monoester maleate and the aromatic vinyl compound being in a ratio of 30-5:70-95% by weight, to thereby obtain a monoester maleate-aromatic vinyl copolymer, and dealcoholating the monoester maleate portion of the copolymer to obtain the aromatic vinyl compound-maleic anhydride copolymer.

* * * * *